US010760640B2

(12) United States Patent
Funke et al.

(10) Patent No.: US 10,760,640 B2
(45) Date of Patent: Sep. 1, 2020

(54) HIGH-VOLTAGE CONNECTION DEVICE FOR AN ELECTRORHEOLOGICAL DEVICE

(71) Applicant: Hitachi Automotive Systems Europe GmbH, Schwaig/Oberding (DE)

(72) Inventors: Joachim Funke, Otzberg (DE); Matthias Bruns, Wiesbaden (DE)

(73) Assignee: HITACHI AUTOMOTIVE SYSTEMS, LTD., Ibaraki (JP)

( * ) Notice: Subject to any disclaimer, the term of this patent is extended or adjusted under 35 U.S.C. 154(b) by 226 days.

(21) Appl. No.: 15/737,425

(22) PCT Filed: Jun. 17, 2016

(86) PCT No.: PCT/EP2016/001020
§ 371 (c)(1),
(2) Date: Feb. 22, 2018

(87) PCT Pub. No.: WO2016/202460
PCT Pub. Date: Dec. 22, 2016

(65) Prior Publication Data
US 2018/0202509 A1 Jul. 19, 2018

(30) Foreign Application Priority Data

Jun. 18, 2015 (DE) .................. 10 2015 007 979

(51) Int. Cl.
*H01R 13/187* (2006.01)
*F16F 9/53* (2006.01)
*F16F 9/32* (2006.01)

(52) U.S. Cl.
CPC ............ *F16F 9/532* (2013.01); *F16F 9/3207* (2013.01); *F16F 9/535* (2013.01); *H01R 13/187* (2013.01)

(58) Field of Classification Search
CPC .......... F16F 9/532; F16F 9/535; H01R 13/187
USPC ............................................. 439/60, 63, 843
See application file for complete search history.

(56) References Cited

U.S. PATENT DOCUMENTS

| 5,934,422 A * | 8/1999 | Steed ........................ F16F 9/46 188/299.1 |
| 7,997,392 B2 | 8/2011 | Stork et al. |
| 2006/0024985 A1* | 2/2006 | Nagata ............... H01R 13/6315 439/63 |
| 2018/0252290 A1* | 9/2018 | Hirao ........................ F16F 9/53 |

OTHER PUBLICATIONS

International Search Report dated Dec. 14, 2016 for WO 2016/202460 A1.

* cited by examiner

*Primary Examiner* — Hae Moon Hyeon
(74) *Attorney, Agent, or Firm* — Abelman, Frayne & Schwab

(57) ABSTRACT

A high-voltage connection device for use with an electrorheological device having a high-voltage connector with an insulating upper part, an insulating lower part, a connector socket, and a central metallic contact pin, wherein the connector socket is fixed to a grounded portion of the electrorheological device and the upper part contains ground terminal elements and is axially connected to the lower part. Additionally, the upper part has a pot-like design and coaxially surrounds both the lower part and the connector socket in the connected state.

12 Claims, 2 Drawing Sheets

HIGH-VOLTAGE CONNECTION DEVICE FOR AN ELECTRORHEOLOGICAL DEVICE

CROSS-REFERENCE TO RELATED APPLICATIONS

This application claims priority to PCT/EP2016/001020, filed 16 May 2016, which claims benefit to German Application No. 10 2015 007 979.4 filed on 18 Jun. 2015.

BACKGROUND OF THE INVENTION

Field of the Invention

The invention relates to a high-voltage connection device for an electrorheological device in accordance with the introductory clause to patent claim 1.

Description of Related Art

Electrorheological devices are extensively employed as oscillation dampers, valves, couplings, actuators or pumps. As a propulsion or control medium, these contain an electrorheological fluid, the viscosity of which can change under the influence of an electric field, to the point of solidification, wherein a high voltage up to approximately 5,000 V is required for the control of viscosity. Electrorheological devices generally comprise a hydraulic cylinder with a piston, the pressure medium chambers of which are filled with the electrorheological fluid, wherein the movement of the piston is controlled by the electrorheological fluid which is located within the electric field. To this end, electrorheological devices are provided with a high-voltage terminal, which is connected to an electrode which is arranged in the electrorheological device, via which the electric field in the electrorheological fluid is generated.

An electrorheological device of this type is known from U.S. Pat. No. 7,997,392 B2, incorporating a high-voltage terminal in the form of a screw-on cable inlet. The electrorheological device is an oscillation damper for the damping of compressive and tensile spring forces in a motor vehicle. To this end, the oscillation damper incorporates an internal pressure medium cylinder, which is divided by a piston into an inlet chamber and an outlet chamber, the movement of which is controlled by an integral electrorheological valve. The electrorheological valve is constituted by the outer tubular jacket of the electrorheological device and an electrode tube which is arranged coaxially therein, which are mutually separated by a narrow valve aperture, by means of which the two pressure medium chambers are interconnected, and through which the flux of electrorheological fluid is controllable. For the purposes of control, the high-voltage terminal is therefore screwed onto the outer tubular jacket in the form of a fixed cable inlet, which interconnects the oscillation damper with an external high-voltage source via a high-voltage cable. For the connection of the high-voltage cable, the outer tubular jacket is milled flat over a predefined surface area, and is provided with a through-hole which extends radially to the electrode tube. The high-voltage terminal is thus comprised of a central cylindrical lower part, which is inserted in the bore, and a metallic upper part arranged coaxially thereto, which cooperates with the flat surface element of the outer tubular jacket. The lower part is comprised of an insulated hard cylindrical plastic body, in the center of which a metal contact element is secured, the lower inner end of which is inserted in a contact bore in the tubular jacket, and the upper outer end of which is connected to the high-voltage cable. For the sealing of the lower part, the plastic body incorporates two externally-applied sealing slots, into which two seals are inserted. For the attachment of the high-voltage terminal, the metallic upper part is configured with an annular design, and has an inwardly-oriented annular recess, into which the lower part is fitted. The cable bushing of the high-voltage cable, which is enclosed in a metal shielding, is naturally electrically bonded to the metallic upper part, and is secured thereto, by means of two mutually-spaced through-holes, in two threaded holes in the outer tubular jacket. The two threaded bolts thus simultaneously form a ground contact of the high-voltage terminal with the grounded tubular jacket, which is arranged in circuit as an opposite pole to the electrode. A high-voltage terminal of this type can only be secured to the tubular jacket in a complex arrangement, by means of threaded holes and a flat seating surface, and is difficult to dismantle again for test purposes or similar.

A high-voltage connection device, which is connectable to an electrorheological device in a plug-in arrangement, by means of a plug connector, is known from DE 10 2013 013 488 A1. Herein, the plug connector of the high-voltage connection device is plugged into a through-hole which is provided in the outer tubular jacket of the electrorheological device, and is thus secured to the outer tubular jacket. The high-voltage plug connector is comprised of an upper part of a hard plastic material, a lower part of a sealing soft plastic material, and a central contact pin for the transmission of a high-voltage up to approximately 5,000 V. The contact pin is molded into the upper part, and can be connected on the upper part to a high-voltage source. In the lower region of the upper part, the contact pin extends into the through-hole and, at its lower tip, is provided with a recessed helical spring which, through the hole and a fluid aperture, cooperates with an electrode tube which is arranged thereunder, and transmits the high voltage to the latter. The upper part is configured in its lower region with a cylindrical design, and is provided in its upper region with a projecting edge portion, upon which two pole shoes are secured, which are downwardly-oriented towards the tubular jacket. These two pole shoes engage with two contact pins which are welded onto the outer tube surface, thus forming a ground connection with the grounded tubular jacket of the electrorheological device. The soft elastic lower part, which is arranged axially below the upper part, is comprised in its upper region of a sealing ring portion, and in its lower region of a seal mating portion, wherein the sealing ring portion is rigidly attached to the upper part, and the seal mating portion is inserted in the through-hole in the outer tube surface to form a pressure-tight seal on the fluid aperture. For the connection of the high voltage to the electrorheological device, the high-voltage plug connector with the seal mating portion of the lower part is plugged into the through-hole, and the two pole shoes are simultaneously fitted to the two grounding pins, such that high voltage is connected to the electrode, and the opposite pole thereof is connected to the ground of the electrorheological device. As the high-voltage connector must frequently be fitted to hard-to-access vehicle components, such as shock-absorbers, the rotation thereof around the central contact pin can easily occur. Accordingly, it is necessary for the central contact pin to be secured, in order that loosely-fitted ground terminals are not detached or damaged.

BRIEF SUMMARY

The object of the invention is therefore the improvement of a high-voltage terminal for an electrorheological device of the above-mentioned type, whereby it is ensured that, with high voltage connected, a ground connection of the housing of the electrorheological device is provided at all times, and the high voltage can easily be connected to, and also disconnected from the electrorheological device.

This object is fulfilled by the invention disclosed in patent claim 1. Further developments and advantageous exemplary embodiments of the invention are disclosed in the sub-claims.

The invention provides an advantage in that, by means of the connector socket for the insertion of the high-voltage connector, which is arranged on the electrorheological device, the high-voltage connector can be fitted to the electrorheological device with high electrical contact stability and in a mechanically secure manner, but can nevertheless be easily connected thereto and disconnected therefrom. The connector socket, in a simple manner, can thus be connected to the electrorheological device in a mechanically secure manner, such that the former can advantageously be connected to the latter in a pressure-proof arrangement, to withstand hydraulic pressures up to 200 bar.

The invention has a further advantage in that, by means of the two-part contact pin for high-voltage transmission, the connection of the electrode in the electrorheological device to the externally infed high voltage is only effected by means of the upper part of the contact pin such that, during the insertion process of the high-voltage connector, no contact with the high-voltage can occur in the high-voltage connector, or on the housing of the electrorheological device. Advantageously, it is thus simultaneously ensured that, during the insertion process, the high voltage temporally succeeds the switching-in of the ground pole, such that the high voltage cannot be connected to a non-grounded part of the device.

A specific embodiment of the invention, having a simple metal bush as a connector socket, has an advantage in that the latter can be easily fitted to a simple through-hole in the electrorheological device, and can be connected to the electrorheological device, in a pressure-proof and mechanically secure manner, by means of an easily-executed welding or soldering process.

A further specific embodiment of the high-voltage connector, with a separate plug-in lower part, has an advantage in that the latter, together with a non-switched-in lower contact pin part, can be prefitted to the connector socket such that, prior to entry into service with a high voltage, leak-tightness and electrical bonding with the electrode can easily be verified beforehand. Specifically, the configuration of the lower part as an insulating plug-in bush has an advantage, in that the latter can be simply manufactured as a plastic injection-molded component, and can be easily prefitted by the simple connection thereof with the lower contact pin part. Advantageously, by the simple insertion of the plug-in bush into the connector socket, the latter can be sealed in relation to the underlying valve aperture, and can be secured therein. Simultaneously, by this arrangement, the high-voltage connector, with its connectable high voltage, is insulated in relation to the housing of the electrorheological device.

A further specific embodiment of the invention, having an upper part which is switched-in in a temporally separate manner upon the completion of the assembly process, has an advantage in that the latter, by means of its pot-shaped plastic component, covers all the electrically-conductive parts of the high-voltage connector in an insulating arrangement. By means of the ground terminal elements arranged in the upper part, and the truncated upper contact pin part in relation thereto, it is advantageously ensured that, during the insertion process, the ground pole is switched-through temporally in advance of the high voltage, such that the use of a high voltage is permissible, even in a vehicle engineering application. As the pot-shaped upper part coaxially encloses both the lower part and the connector socket, at least in respect of structural height, a highly compact high-voltage connector is achievable, which can therefore be fitted directly to an electrorheological oscillation damper in the wheel arch of a vehicle. By means of the compact design, it is simultaneously possible to advantageously integrate the upper part of the high-voltage connector into a controllable high-voltage transformer with an output voltage of up to 5,000 V, in order to permit the control of the electrorheological device in a compact and high-voltage-resistant arrangement, with no external high-voltage conductors.

A further specific embodiment of the invention, wherein the two radially positioned spring elements are configured as ground terminal elements in the upper part of the high-voltage connector, has an advantage in that not only the high-voltage connector, but also a high-voltage transformer connected thereto, are both electrically and mechanically connectable to the electrorheological device in a plug-in and rotatable arrangement. Thus, simultaneously and advantageously, a plurality of rotary angular positions are eligible for connection to the electrorheological device, such that the latter can also be fitted to hard-to-access vehicle components, or to existing fixing holes on the shock-absorber, with no complex adaptation.

An additional specific embodiment of the invention, having a relatively long inner socket in the pot-shaped plastic component, has an advantage in that the upper contact pin part arranged therein is thus securely protected against unintentional contact with the high voltage. At the same time, the inner socket in the upper part advantageously serves as a guide during the insertion process, and provides additional insulation protection vis-à-vis the adjoining ground terminal elements, as it prevents any lateral reduction of insulation clearances. The inner socket can also be secured by means of friction-fit or snap-fit elements, which advantageously provide a secure attachment in the lower part of the high-voltage connector.

BRIEF DESCRIPTION OF THE DRAWINGS

The invention is described in greater detail hereinafter with reference to an exemplary embodiment, which is represented in the drawing. Herein.

DETAILED DESCRIPTION

Figure 1:
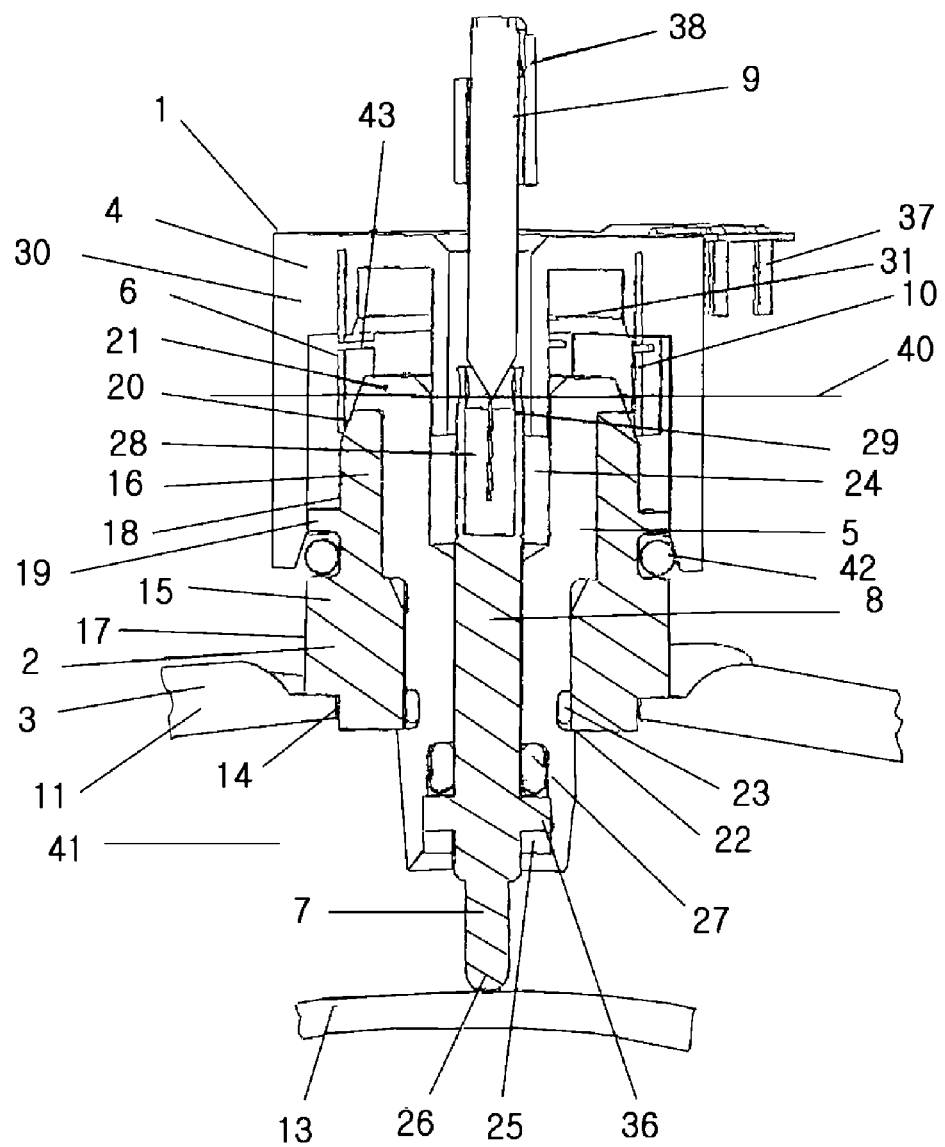
FIG. 1: shows a lateral sectional view of a high-voltage connection device on an electrorheological vehicle damper.

FIG. 1 represents a sectional view of a high-voltage connection device, which is essentially comprised of a high-voltage connector 1 fixed in a connector socket 2, wherein the connector socket 2 is attached to an electrorheological oscillation damper 3 in the form of an electrorheological device.

The sectional representation is shown in a plugged-in state, in which an upper part 4 of the high-voltage connector 1 is not yet fully axially fitted to the connector socket 2 and a lower part 5. As an external housing component, the electrorheological device comprises a grounded metal outer tube 11, constituting the ground potential, below which a valve aperture 12 is routed, which carries a controllable flux of electrorheological fluid. In the intervening region, a cylindrical metal tube 13 is arranged, which radially delimits the valve aperture 12 and simultaneously functions as an electrode 13 for the high voltage.

For the connection of the ground contacts of the high-voltage connector 1 with the oscillation damper 3, the cylindrical outer metal wall 11 of the damper 3 incorporates a metal connector socket 2, which is fitted into a through-hole 14, and is preferably welded or soldered to the bore walls of the outer tube 11 in a pressure-tight arrangement. The connector socket 2 is preferably comprised of a steel alloy, of which the outer tube 11 is also formed, wherein both can also be comprised of high-grade steel, aluminum, or another appropriate metal. The connector socket 2 is configured as a specially-designed metal bush which, in its lower region, is flush-fitted to the inner wall of the outer tube 11, and projects vertically upwards approximately 8-15 mm beyond the outer tube 11, wherein the through-hole 14 has a diameter of 5 approximately 8-15 mm. The metal bush 2 has a stepped inner bore which, in the lower region 15, has a diameter of approximately 4-8 mm and, in the upper region 16, has a somewhat larger diameter of approximately 6-10 mm. On its outer wall, the metal bush 2, at its lower end, incorporates an expanded cylindrical region 17 of preferably 12 mm in diameter, and in its upper region a reduced cylindrical region 18 of approximately 10 mm in diameter.

In the upper cylindrical region 18, a guide ring 19 is preferably left in place, which serves for the guidance of the upper part 4 during the insertion process. The metal bush 2 moreover incorporates, at its upper tip, a further conical locating bevel in the form of a locating chamfer 20, upon which the spring elements 6 of the upper part 4 slide on the upper cylindrical region 18 during the insertion process.

In the inner bore of the metal bush 2, the lower part 5 of the high-voltage connector 1 is inserted in a form-fitted manner, wherein the final insertion position thereof is represented. The lower part 5 of the high-voltage connector 1 is configured as a plug-in bush 5, which is comprised of an electrically-insulating plastic resin, and projects beyond the bush-shaped 20 connector socket 2 at both the top and bottom. In the interior of the metal bush 2, the outer shape of the plug-in bush 5 is adapted to the inner shape of the connector socket 2. An upwardly-projecting portion of the plug-in bush has a projecting annular part 21 which, in the upper region, cooperates with the interior of the metal bush 2, and terminates with a bevelled annular surface on the locating chamfer 20. The bevel on the annular surface permits the easy sliding of the spring elements 6 on the connector socket 2.

The diameter of the plug-in bush part which projects from the bottom of the connector socket 2 tapers in the downward direction, and preferably incorporates a plurality of unrepresented longitudinal slots, extending to the start of the bush-shaped connector socket 2, wherein hook clamps 22 are arranged between the slots, which secure the plug-in bush 5 to the connector socket 2 in an external snap-fit arrangement. On the outer circumference of the plug-in bush 5, in the lower region of the connector socket 2, an annular groove is left in place, in which a first O-ring 23 for the sealing of the damper space 41 is inserted.

In the center of the plug-in bush 5, a continuous axial bore is arranged, into which the lower part of the contact pin 7, in the form of a lower contact pin part 8, is inserted in a form-fitted manner. This lower contact pin part 8 preferably has a diameter of approximately 2 to 5 mm. In the upper inner region 24 and the lower inner region 25 of the plug-in bush 5, a diametral extension of approximately 2 to 4 mm respectively is incorporated, the function of which, at the top end, is the guidance of the upper part 4 and, at the bottom end, the sealing of the lower contact pin part 8. The lower contact pin part 8 of the two-part contact pin 7 is arranged within the axial bore. The former projects from the bottom of the plug-in bush 5 by approximately 1 to 2 mm, such that the rounded contact tip 26 thereof engages with the electrode 13, thus forming the electrical contact for the high voltage. Said contact tip 26 can also incorporate a compression spring, the compression force whereof maintaining secure contact between the lower contact pin part 8 and the electrode 13. Within the lower diametral extension of the plug-in bush 5, the inserted lower contact pin part 8 further incorporates a circumferential annular web 36, which is adapted to the lower inner region 25 and executes an upper end insertion limitation function, and is delimited for sealing at its upper end by a second O-ring 27.

The lower contact pin part 8 terminates in the upper inner region 24 of the plug-in bush 5, and is thus approximately flush to the top surface of the plug-in bush 5. In the upper inner region 24 of the plug-in bush 5, the lower contact pin part 8 incorporates a connecting part 28, which is configured as a spring bush. This connecting part 28 is characterized on its interior by a bore and, on its outer walls, incorporates four axial longitudinal slots, which constitute four spring tongues 29, by means of which this connecting part 28 is connectable to an upper contact pin part 9 with high contact stability. This lower contact pin part 8 is comprised of an electrically conductive metal, preferably of a non-oxidizing steel alloy, copper or brass.

Figure 2:
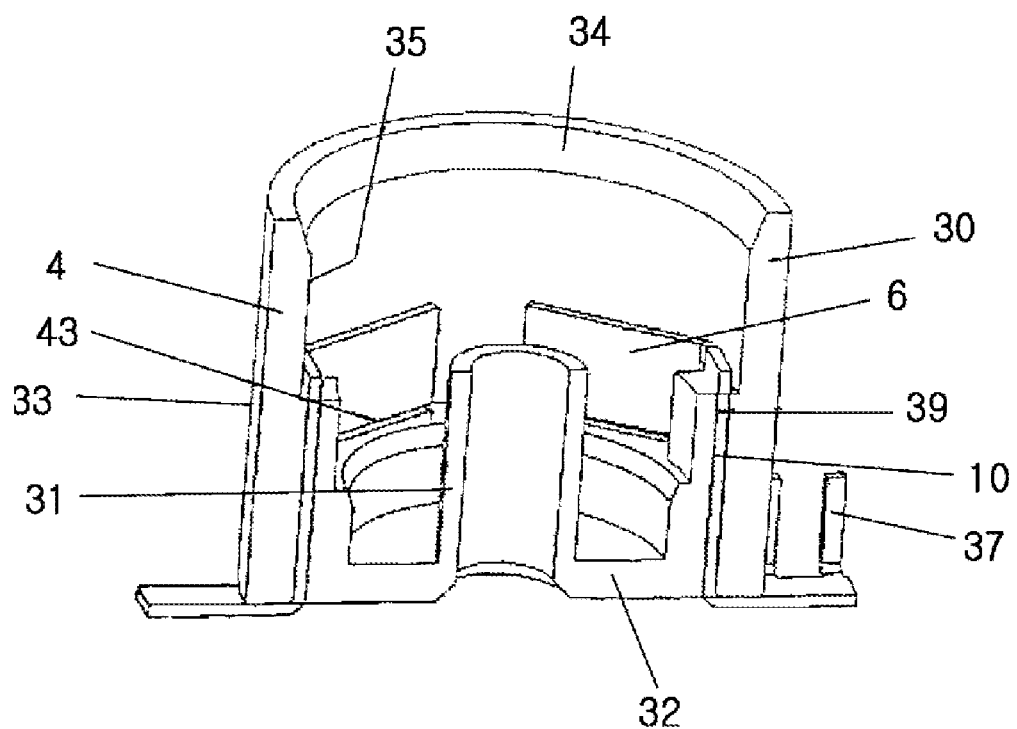
FIG. 2: shows a perspective lateral sectional view of an upper part of the high-voltage connection device.
Figure 3:
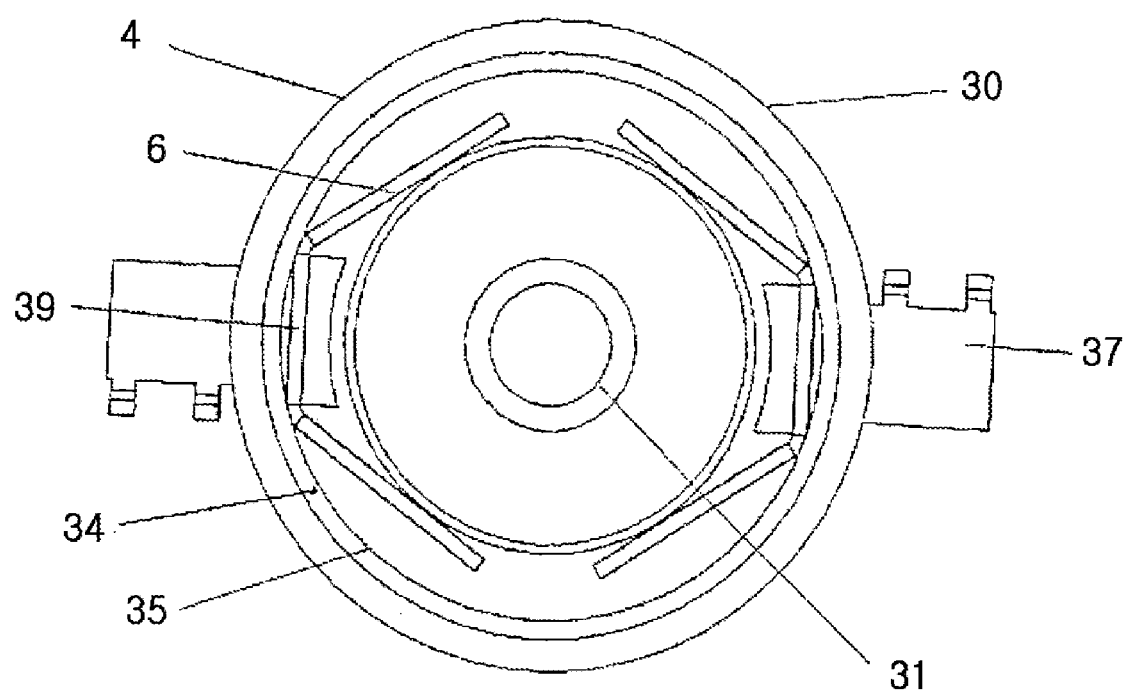
FIG. 3: shows an overhead view of the upper part.

Above the connector socket 2 and above the lower part 5, the upper part 4 of the connector 1 is arranged. This is essentially comprised of a pot-shaped plastic component 30, which is open at its lower end, in which the metal ground terminal elements 10 are embedded. The upper part 4 can be seen in greater detail in FIG. 2 and FIG. 3. The pot-shaped plastic component 30 is preferably produced from a dimensionally stable plastic with good electrical insulation properties by a plastic injection-molding process, is approximately 10 to 15 mm high, and preferably has an external diameter of approximately 15 to 20 mm. In the center, the upper part 4 incorporates an inner socket 31 which, by means of a base part 32, is securely attached to the cylindrical outer wall 33 of the upper part 4. The inner socket 31 preferably projects axially into the inner space by 5 to 7.5 mm, and thus constitutes a complete radial cover for the upper contact pin part 9, such that the latter is protected against unintentional contact, even in the unplugged state. The cylindrical outer wall 33, on its downwardly-oriented edge, incorporates an internally-tapered bevel edge 34, which guides the sliding thereof onto the connector socket 2 during the insertion process. The upper part 4 is thus attached to the connector socket 2 by a clamping force.

Between the inner shell surface 35 of the outer wall 33 and the base part 32, the two ground terminal elements 10 are arranged in opposition, and are securely mechanically bonded to the latter by the injection-molding process. The two ground terminal elements 10 are comprised of two electrically independent ground terminal parts, which are arranged tangentially to the inner shell surface 35. Each ground terminal element 10 is comprised of two radially-arranged spring elements 6, a central contact part 39 and an externally brought-out terminal contact 37, all of which are electrically interconnected. The two ground terminal elements 10 are arranged in 180° opposition, wherein the four spring elements 6 are preferably configured as leaf springs, and constitute rectangular or square sheet metal plates which are oriented tangentially to the metal bush of the connector socket 2. Between the embedded part and the upwardly projecting part of the individual spring elements 6, a horizontal slot 43 is arranged, by means of which, during the manufacturing process, the ingress of injection-molding compound into the sprung region is prevented. The sprung part of the spring elements 6 thus remains free-moving, and can cooperate with the connector bush 2 in a resilient arrangement. For the formation of secure electrical contact, a radial spring force is applied to the two leaf springs 6 of a ground terminal element 10, such that these are radially and electrically bonded to the connector socket 2 in the upper cylindrical region 18 thereof. Accordingly, electrical connection cannot be impaired by a rotary movement during the insertion process or during operation, as the spring elements 6, by means of their radial spring tension, are consistently maintained in secure contact with the metal bush of the connector socket 2. Alternatively, however, the spring elements 6 can also be formed of curved plates or axially-configured brackets which, by means of a spring force, cooperate with the outer shell surface of the metal bush 2.

Axially, the spring elements 6 extend to a length which corresponds to approximately one half of the height of the pot-shaped plastic component 30. This length is likewise dependent upon the axial dimensions of the metal bush 2 and the contact pin parts 8, 9 as, by means of the ground terminal elements 10, during insertion and withdrawal, it is intended to be ensured that the ground connection is established temporally in advance of the switching-through of the high voltage and, at the same time, remains in place after the high voltage has been disconnected by the withdrawal of the high-voltage connector 1.

The plugged-in state shown in FIG. 1 thus represents an insertion process in which the high-voltage connector 1, during the insertion process, by means of its ground terminal elements 10, is already electrically bonded to the metal bush 2. Simultaneously, the upper contact pin part 9 engages directly with the spring tongues 29 on the lower contact pin part 8, by means of which the high voltage can be transmitted to the electrode 13. To this end, the upper contact pin part 9 is comprised of a round metallic bolt, which projects axially downwards to the connecting part 28 of the lower contact pin part 8, to the extent that it is axially shorter than the downwardly oriented spring elements 6. The length of the round bolt is thus tailored to the axial length of the connector socket 2. The upper contact pin part 9 can thus constitute an independent plug-in part, or can be securely fixed in the inner socket 31 through an opening in the base of the upper part 4. However, the upper contact pin part 9 can also be connected to a high-voltage transformer part which is bonded to the upper part 4. Preferably, the upper part 4 is connected to an unrepresented high-voltage transformer part for the control of the electrorheological device and, in combination with the latter, can be plugged onto the lower part 5 of the connector 1. By this arrangement, firstly the two ground terminal elements 10, and thereafter also the high voltage are connected to the electrorheological device via the upper contact pin part 9. Although only two ground terminal elements 10 are represented, configurations with one, or three, or more ground terminal elements 10 are also conceivable.

The assembly and circuit connection of the high-voltage connection device proceeds as follows:

For the assembly of the connector socket 2, a through-hole 14 of approximate diameter 8 to 15 mm is firstly drilled in the outer tube 11 of the oscillation damper. The connector socket 2 is then fitted in the bore, perpendicularly to the outer tube 11, and is preferably welded or soldered to the outer tube 11 in a pressure-tight arrangement. However, the connector socket 2 might also be connected to the outer tube 11 in an electrically-conductive manner by means of a threaded connection.

In the next assembly step, the plug-in bush is prepared in the form of the lower part 5, wherein the lower contact pin part 8 is inserted into the latter from below and, by means of the annular web 36, is secured therein in the lower inner region 25. However, the lower contact pin part 8 can also be bonded to the plug-in bush 5 in a secure and pressure-tight manner. The contact tip 26 of the lower contact pin part 8 preferably projects by a distance of 1 mm beyond the lower inner region 25 of the plug-in bush 5, whereas the lower contact pin part 8 in the upper inner region 24 of the plug-in bush 5 is approximately flush to the latter. This pre-assembled lower part 5, for the connection of the high-voltage connector 1, is then inserted into the connector socket 2 to the extent that the hook clamps 22 of the plug-in bush 5, upon the exit thereof from the connector socket 2, snap onto the inner edge of the latter, such that the lower part 5 is attached to the connector socket 2.

For the connection of the high-voltage connector 1 with its lower part 5, in the next assembly step, the upper part 4 with its pot-shaped plastic component 30 is then pushed from above onto the lower part 5 and the connector socket 2 which encloses the latter, and is thus secured thereto. The function of the bevel edge 34 is the guidance of the upper part 4 onto the lower cylindrical region 17 of the connector socket 2 during the insertion process. Previously, a third O-ring 42 has been fitted to the connector socket 2 between the guide ring 19 of the metal bush and the lower cylindrical region 17. The function of this third O-ring 42 is the complete sealing of the high-voltage connector 1 against external influences. The upper part 4 is pushed approximately a further 1 to 2 mm onto the lower part 5 than is represented in FIG. 1, wherein the annular part 21 of the plug-in bush 5 engages with the underside of the base part 32 of the pot-shaped plastic component 30.

During this insertion process, the four plate-type radial spring elements 6 are firstly pushed onto the locating chamfer 20 of the connector socket 2, and thus constitute the ground contact to the electrorheological device in the form of the oscillation damper. As two independent and redundant ground terminal elements 10 are incorporated in the upper part 4, it can already be determined at this point, by means of an unrepresented test circuit, whether an electrically-conductive ground connection has been established. To this end, a test voltage of equal magnitude can be applied to each ground terminal element 10, wherein, in the event of a deviation in the test currents, a fault in the ground connection is signaled, or the high voltage is switched-out. This test circuit is preferably incorporated in an unrepresented high-voltage part, arranged above the high-voltage connector 1, which is connectable to the high-voltage connector 1 via the external terminal contacts 37.

Subsequently to the ground terminal elements 10, in the insertion process, the connection of the electrical high voltage proceeds between the upper contact pin part 9 and the lower contact pin part 8 in the plug-in connecting part 28. To this end, it is provided that the upper contact pin part 9 is preferably axially configured to a somewhat shorter length than the spring elements 6 with respect to a common horizontal line 40, such that the spring elements 6 complete the ground connection temporally in advance of the high-voltage connection in the connector 1. It is thus ensured, during both the insertion and the withdrawal process, that the high voltage cannot be applied in the absence of a ground connection on the oscillation damper.

In order to exclude human contact with the high voltage under any circumstances, the upper contact pin part 9 is configured as a separate component, or is connected to the upper part 4 in the center of the latter. In the case of attachment to the upper part 4, the upper contact pin part 9 preferably projects upwardly from the latter by approximately 5 mm and incorporates, in its upper outer wall part, two opposing axial guide webs 38, which are insertable in an unrepresented high-voltage socket of the high-voltage part, and form the electrical connection to the high voltage. However, the upper part 4 of the high-voltage connector 1 can also be rigidly connected to the high-voltage part such that, in combination, both can be fitted to the lower part 5 for the switching-in of the high voltage. By means of the upper contact pin part 9, with its shorter configuration in relation to the ground terminal elements 10, arranged in the interior of the upper part 4, it is also ensured that human contact with the high voltage is excluded, and the switching-in of the high voltage in the absence of a ground connection is prevented. In a specific embodiment of the high-voltage connection device, it is specifically provided that the upper part 4 of the high-voltage connector 1 is integrated in the high-voltage part, with its controllable high-voltage transformer, thus permitting the achievement of an exceptionally compact design for both components. As the same time, the employment of a high-voltage cable between the high-voltage connector 1 and the high-voltage transformer is avoided. In this embodiment, the ground terminal elements 10 of the upper part 4 can be connected to the inner circumference of the connector socket 2, even though the ground terminal elements 10 of the upper part 4 are connected to the outer circumference of the lower part 5. In this case, on the inner circumference of the locating chamfer 20 of the connector socket 2, an edge of continuously reducing diameter is provided.

The invention claimed is:

1. A high-voltage connector for an electrorheological damper comprising:
   an upper part including a base, an outer cylindrical wall extending from the base, and a plurality of spring elements radially arranged within the outer cylindrical wall;
   a connector socket configured to be fixed to the electrorheological damper;
   a lower part coaxially positioned within the connector socket;
   a lower pin coaxially positioned within the lower part; and
   an upper pin configured to be inserted into an opening in the base of the upper part,
   wherein when the upper pin is positioned within the upper part and the upper part is axially connected to the lower part, the outer cylindrical wall of the upper part coaxially surrounds the connector socket and the lower part, the plurality of spring elements radially surround and contact the connector socket, and the upper pin contacts the lower pin, and
   wherein the plurality of spring elements are configured to contact the connector socket prior to contact between the upper pin and lower pin.

2. The high-voltage connector of claim 1, wherein the upper part further includes a plurality of ground terminals connected to the plurality of spring elements.

3. The high-voltage connector of claim 2, wherein each ground terminal includes a central contact portion connected to a pair of the spring elements, wherein the spring elements are arranged at an angle which is oriented tangentially and radially to an outer circumference of the connector socket, and
   wherein when the upper part is axially connected to the connector socket, the spring elements engage the connector socket with a predefined spring force.

4. The high-voltage connector of claim 3, wherein the central contact portion of the ground terminal is connected to an external contact terminal arranged outside the upper part.

5. The high-voltage connector of claim 4, wherein at least two of the ground terminals are positioned in a radially opposing arrangement.

6. The high-voltage connector of claim 1, wherein the connector socket includes a locating bevel which conically extends toward an upper end of the connector socket and a cylindrical portion arranged beneath the locating bevel, the cylindrical portion of the connector socket being configured to contact the plurality of spring elements.

7. The high-voltage connector of claim 6, wherein the connector socket further includes a lower region having an outer diameter larger than an outer diameter of an upper region of the connector socket, and
   wherein the upper region of the connector socket has an inner diameter larger than an inner diameter of the lower region of the connector socket such that an inner diameter of the lower part is stepped.

8. The high-voltage connector of claim 1, wherein the lower part has an outer diameter including two axially stepped regions, which engage with an internal diameter of the connector socket in a form-fitted manner,
   wherein the lower part includes an annular portion at an upper end thereof, which cooperates with the upper end of the connector socket, and
   wherein the lower part further includes at least two hook clamps at a lower end thereof, for attachment to the connector socket in a snap-fit arrangement.

9. The high-voltage connector of claim 8, wherein the lower part includes a continuous axial bore extending along a lower portion and an upper portion of the lower part, the continuous axial bore having a diameter in the lower portion of lower part corresponding to an external diameter of the lower pin, and
   wherein a diameter of the continuous axial bore in the upper portion of the lower part is larger than the diameter of the continuous axial bore in the lower portion of the lower part.

10. The high-voltage connector of claim 1, wherein the lower pin is fitted within a continuous axial bore of the lower part in a plug-in arrangement such that an upper end of the lower pin is flush with an upper end of the lower part, and a lower end of the lower pin projects outwardly from a lower end of the lower part, and
    wherein the upper end of the lower pin includes a connecting portion for connecting to the upper pin and the lower portion of the lower pin includes a contact tip configured to connect to an electrode.

11. The high-voltage connector of claim 1, wherein the upper part further includes an inner socket extending from the base and positioned axially within the outer cylindrical wall and an open end opposite the base.

12. The high-voltage connector of claim 1, wherein lower ends of the spring elements are configured to extend in an axial direction and terminate at a position below a lower end of the upper pin when the upper pin is positioned within the upper part such that as the upper part is connected to the connector socket, the spring elements are configured to form a ground connection via the connector socket prior to a high-voltage connection being formed by a high-voltage transformer via the upper pin, and as the upper part is withdrawn from the connector socket, the high-voltage connection is interrupted prior to an interruption of the ground connection.

* * * * *